United States Patent Office
3,026,174
Patented Mar. 20, 1962

3,026,174
PRODUCTION OF PHOSPHONITRILIC OILS
Norman L. Paddock, Wolverhampton, England, assignor to Albright and Wilson (Mfg.) Limited, Oldbury, near Birmingham, England, a British company
No Drawing. Filed Aug. 25, 1958, Ser. No. 757,132
Claims priority, application Great Britain Sept. 6, 1957
9 Claims. (Cl. 23—14)

This invention relates to a method for the production of phosphonitrilic oils in greater yields than have until now been possible.

The reaction of phosphorus pentachloride with ammonium chloride gives rise not only to the well-known series of polymers $(PNCl_2)_n$, where $n$ is an integer of from 3 to 7 or more, but also to oily undistillable residues which are substantially insoluble in petroleum ether, these oils usually being produced in yields of from 15 to 20%. Such phosphonitrilic oils are referred to frequently in the literature, see, for example, H. N. Stokes, American Chemical Journal, volume 19, 782 (1897), Schenk and Römer, Berichte, volume 57B, 1343 (1924), F. Patat and F. Kollinsky, Makromol. Chem., volume 6, 292 (1951). Stokes, in particular, mentions an oily undistillable residue of average composition $(PNCl_2)_{11}$.

It is suggested that these oily polymers, which are insoluble in petroleum ether, are not true polymers of the $(PNCl_2)_n$ type, but consist of chains of from 10 to 20 $PNCl_2$ units end-blocked with the elements of phosphorus pentachloride. The suggested formula is thus:

If the reaction is carried out substantially as described by Schenk and Römer, the yield of such polymers, insoluble in petroleum ether, is of the order of 10–25%.

It has now been found that the oily polymers can be prepared in much higher yield, over 70%, by the reaction of polyphosphonitrilic chlorides with the acid chlorides, particularly phosphorus pentachloride, at temperatures above about 300° C. The reaction is carried out without solvent, since at such high temperatures most solvents would pyrolyse, and in a sealed vessel to prevent loss of reactants by evaporation.

According to the present invention, there is provided a process for the production of phosphonitrilic oils which comprises heating a polyphosphonitrilic chloride with an acid chloride, particularly phosphorus pentachloride, in a sealed vessel at a temperature above 250° C., preferably above 300° C.

In the absence of phosphorus pentachloride, the simple ring compounds $(PNCl_2)_n$ polymerise, slowly at about 250° C. and rapidly at about 350° C., to a rubber-like material. De-polymerisation of the polymer, in the absence of phosphorus pentachloride, begins at about 380° C. It is believed that, in the presence of phosphorus pentachloride, as the rings open to polymerise, the elements of phosphorus pentachloride attach themselves to the ends of the chain to give linear polymers of high polarity and consequent low solubility in non-polar media, such as petroleum ether. Provided that the ratio of phosphorus pentachloride to polyphosphonitrilic chloride is high enough, the products are oils of low volatility and high chemical reactivity, but if the ratio is as high as or higher than 1:1 the products are solid. If the ratio is too low, for example 1:100, then, of course, the main product is the normal polymerisation product of $(PNCl_2)_n$, a solid rubber.

The phosphonitrilic chlorides $(PNCl_2)_n$ may be used either singly, as for example the trimer $(PNCl_2)_3$ or the tetramer $(PNCl_2)_4$, or as mixtures in which various values of $n$ are represented. The mixture of phosphonitrilic chlorides obtained by the method of Schenk and Römer, from ammonium chloride and phosphorus pentachloride in tetrachloroethane, is suitable.

The phosphonitrilic oils produced by the process of this invention are of low volatility and high chemical reactivity and can be used for those purposes for which phosphonitrilic chlorides have been proposed. They are preferred to the phosphonitrilic chlorides $(PNCl_2)_n$, where $n$ is from 3 to 7, since they are liquid and hence more easily handled, and are less volatile and more reactive than the phosphonitrilic chlorides.

The following examples serve to illustrate the invention:

*Example 1.*—20 gm. of phosphorus pentachloride were heated with 100 gm. of trimeric phosphonitrilic chloride in an autoclave for two-and-a-half hours at 350° C. The product was a thin oil containing a trace of solid which, when extracted with petroleum ether boiling between 40° and 60° C., gave a 74% yield of a dark-green oil insoluble in the petroleum ether. The colour was mainly due to traces of corrosion products from the autoclave.

*Example 2.*—As in Example 1, 20 gm. of phosphorus pentachloride were heated with 100 gm. of trimeric phosphonitrilic chloride, in an autoclave, but this time, heating was continued for seven hours. A dark-brown mobile oil was obtained, which when extracted with petroleum ether boiling between 40° and 60° C., gave a 90% yield of a blue-green oil insoluble in the petroleum ether.

*Example 3.*—A crude mixture of phosphonitrilic chlorides was prepared by the method of Schenk and Römer and the insoluble material was separated by extraction with petroleum ether. 70 gm. of the soluble part of the mixture were heated with 30 gm. phosphorus pentachloride in an autoclave fitted with a glass liner at 350° C. for five and three-quarter hours, at the end of which time the product was a clear, light-brown mobile oil, of viscosity 360 centipoises at 22° C.

*Example 4.*—80 gm. of the extracted mixture of the phosphonitrilic chlorides, as used in Example 3, were heated with 20 gm. phosphorus pentachloride in an autoclave fitted with a glass liner at 350° C. for 6 hours, at the end of which time the product was a clear, light-brown oil of viscosity 86,000 centipoises at 22° C.

*Example 5.*—26.6 gm. anhydrous aluminum chloride and 70 gm. trimeric phosphonitrilic chloride were heated together in an autoclave fitted with a glass liner at 350° C. for 5 hours. The product was a thick black oil.

*Example 6.*—26.7 gm. anhydrous aluminum chloride were heated with 23.2 gm. trimeric phosphonitrilic chloride in an autoclave fitted with a glass liner at 285° C. for 3 hours and yielded a thick black oil.

*Example 7.*—16.2 gm. anhydrous ferric chloride and 34.8 gm. trimeric phosphonitrilic chloride were heated for 4 hours in a glass tube inside an autoclave at 360° C., at the end of which time the product was a thick black viscous oil.

*Example 8.*—44 gm. stannic chloride and 15 gm. trimeric phosphonitrilic chloride were heated together for 2 hours in an autoclave at 300° C. and gave a mixture of a clear oil and a white solid.

I claim:
1. A process for the production of phosphonitrilic oil which comprises heating in a sealed vessel at a temperature above 250° C. a solventless mixture consisting essentially of a previously produced polyphosphonitrilic chloride and a member selected from the group consisting of phosphorus pentachloride, ferric chloride, aluminum chloride and stannic chloride, whereby the molecular structure of the phosphonitrilic oil produced consists of $PNCl_2$ units end-blocked with elements of the member.

2. A process for the production of phosphonitrilic oils, the molecular structure of which consists of $PNCl_2$ units end-blocked with elements of phosphorus pentachloride, which comprises heating in a sealed vessel at a temperature above 250° C. a solventless mixture consisting essentially of polyphosphonitrilic chloride and phosphorus pentachloride.

3. A process for the production of phosphonitrilic oils which comprises heating in a sealed vessel at a temperature above 250° C. a solventless mixture consisting essentially of polyphosphonitrilic chloride and ferric chloride.

4. A process for the production of phosphonitrilic oils which comprises heating in a sealed vessel at a temperature above 250° C. a solventless mixture consisting essentially of polyphosphonitrilic chloride and aluminum chloride.

5. A process for the production of phosphonitrilic oils which comprises heating in a sealed vessel at a temperature above 250° C. a solventless mixture consisting essentially of polyphosphonitrilic chloride and stannic chloride.

6. A process for the production of phosphonitrilic oils, the molecular structure of which consists of $PNCl_2$ units end-blocked with elements of phosphorus pentachloride, which comprises heating a solventless mixture consisting essentially of phosphorus pentachloride and polyphosphonitrilic chloride in the weight ratio of phosphorus pentachloride to polyphosphonitrilic chloride of from 1:100 to 1:1 in an autoclave at a temperature between 300° C. and about 360° C.

7. A process for the production of phosphonitrilic oils, the molecular structure of which consists of $PNCl_2$ units end-blocked with elements of phosphorus pentachloride, which comprises heating a solventless mixture consisting essentially of phosphorus pentachloride and phosphonitrilic chloride trimer in the weight ratio of phosphorus pentachloride to polyphosphonitrilic chloride of from 1:100 to 1:1 in an autoclave at a temperature between about 300° C. and about 360° C.

8. A process for the production of phosphonitrilic oils, the molecular structure of which consists of $PNCl_2$ units end-blocked with elements of phosphorus pentachloride, which comprises heating a solventless mixture consisting essentially of phosphorus pentachloride and phosphonitrilic chloride tetramer in the weight ratio of phosphorus pentachloride to polyphosphonitrilic chloride of from 1:100 to 1:1 in an autoclave at a temperature between about 300° C. and about 360° C.

9. A process for the production of phosphonitrilic oils, the molecular structure of which consists of $PNCl_2$ units end-blocked with elements of phosphorus pentachloride, which comprises heating a solventless mixture consisting essentially of phosphorus pentachloride and a mixture of phosphonitrilic chloride trimer and phosphonitrilic chloride tetramer in the weight ratio of phosphorus pentachloride to said mixture of phosphonitrilic chloride trimer and phosphonitrilic chloride tetramer of from 1:100 to 1:1 in an autoclave at a temperature between about 300° C. and about 360° C.

References Cited in the file of this patent

UNITED STATES PATENTS 2,192,921   Lipkin _____ Mar. 12, 1940

OTHER REFERENCES

Steinman et al.: "Chemical Reviews," vol. 32, pages 119, 122 (1943).

Steinman et al.: "Journal of the American Chemical Society," vol. 64, pages 2377–2378 (1942).

Schenck et al.: "Deutsche Chemische Gesellschaft Berichte," vol. 57, 1924, pages 1343–55.

German printed application, No. 1,064,039, printed Aug. 27, 1959.